United States Patent [19]

Deutschenbaur et al.

[11] Patent Number: 5,000,631
[45] Date of Patent: Mar. 19, 1991

[54] WORKING TOOL HOLDER FOR A DRILLING OR CHISELING DEVICE

[75] Inventors: Paul Deutschenbaur, Germering; Hans Rupprecht, Munich; Franz Hoyss, Wackersberg, all of Fed. Rep. of Germany

[73] Assignee: Hilti Aktiengesellschaft, Fürstentum, Liechtenstein

[21] Appl. No.: 290,146

[22] Filed: Dec. 23, 1988

[30] Foreign Application Priority Data

Dec. 24, 1987 [DE] Fed. Rep. of Germany ....... 3744091

[51] Int. Cl.⁵ ............................................. B23B 31/12
[52] U.S. Cl. ..................................... 408/240; 279/65; 279/82; 279/97; 279/101; 409/232; 408/226
[58] Field of Search .................... 279/1 B, 24, 28–30, 279/55, 57, 58, 79, 82, 97, 7, 99–101, 76–78, 103, 65, 89, 94, 93, 91, 90, 80, 81, 22, 75; 82/158, 160; 409/234, 232, 233; 408/239 R, 240, 226

[56] References Cited

U.S. PATENT DOCUMENTS

| | | | |
|---|---|---|---|
| 1,030,387 | 6/1912 | Critton | 279/99 |
| 1,635,909 | 7/1927 | Tobeler | 279/30 |
| 2,089,166 | 8/1937 | Reichardt | 279/30 |
| 2,212,406 | 8/1940 | Rusnak | 279/1 B |
| 2,580,930 | 1/1952 | Kost | 279/30 |
| 2,948,559 | 8/1960 | Recker | 279/1 B |
| 3,658,351 | 4/1972 | Benjamin et al. | 279/89 X |
| 4,701,083 | 10/1987 | Deutschenbaur et al. | 408/240 |

FOREIGN PATENT DOCUMENTS

| | | | |
|---|---|---|---|
| 228107 | 4/1954 | Australia | 279/76 |
| 2413021 | 10/1975 | Fed. Rep. of Germany | 279/1 B |
| 3605970 | 8/1987 | Fed. Rep. of Germany | 279/1 B |

*Primary Examiner*—Z. R. Bilinsky
*Assistant Examiner*—R. Schultz
*Attorney, Agent, or Firm*—Toren, McGeady & Associates

[57] ABSTRACT

A working tool holder for a drilling or chiseling device includes a holder sleeve with an axially extending conically shaped section within a holder opening or bore. A working tool to be secured in the holder sleeve, has a tool shaft with a conically shaped section to engage the conically shaped section in the holder opening. Grooves are formed in the tool shaft to receive inwardly projecting ridges in the holder opening. The tool shaft has recesses to receive the pins mounted in the holder sleeve. The tool shaft and an actuating sleeve extending around the holder sleeve each have connecting threads for securing the working tool in the holder.

2 Claims, 2 Drawing Sheets

WORKING TOOL HOLDER FOR A DRILLING OR CHISELING DEVICE

BACKGROUND OF THE INVENTION

The present invention is directed to a working tool holder for a drilling or chiseling device and to a working tool. The working tool holder includes a holder sleeve with an opening for the insertion shaft of a working tool. An axially extending section of the opening tapers conically inwardly. Pins mounted in the holder sleeve can be moved generally radially into the holder opening by means of a spring force. The pins extend tangentially or chordally relative to the holder opening. Inwardly projecting ridges are located in the holder opening for engagement in corresponding grooves in the insertion shaft. Further, the insertion shaft has recesses for seating the pins. An actuating sleeve axially displaceable relative to the holder sleeve is arranged for moving the pins relative to the holder opening.

A working tool holder is known in DE-A No. 1-34 34 076 and insures an exact centric guidance and reliable axial support of the inserted working tool during a drilling operation. At the commencement of the drilling operation, such high transverse or shearing forces develop, due to the lack of lateral guidance of the working tool, that the working tool may become loosened.

SUMMARY OF THE INVENTION

The primary object of the present invention is to form a working tool holder and a working tool of the type described above so that a reliable support of the working tool is assured, in addition to exact centric guidance, even when high transverse forces are developed. In accordance with the present invention, the actuating sleeve and the working tool comprise connecting means acting in cooperation with one another.

With such connecting means, the working tool held in the holder sleeve by pins, can be reliably secured by the actuating sleeve by axial clamping of the conically shaped sections of the holder opening and the insertion shaft by way of the connecting means.

In addition to transverse forces, the working tool holder with the working tool secured in it, is also subject to vibration during use, so that a securing element which counteracts disengagement of the connecting means is provided. Clamping rings, catches or locking pins, for example, are suitable for such securing elements.

Preferably, the connecting means for the working tool holder is an internal thread formed in the actuating sleeve. Correspondingly, an external thread on the insertion shaft provides the connecting means on the working tool.

A threaded connection, provided by the internal thread in the working tool holder and the external thread on the working tool, affords a sufficient connection of the insertion shaft in the holder sleeve without the use of auxiliary work tools. Preferably, a milling or knurling is provided on the outside surface of the actuating sleeve to facilitate the manual application of the torque required for screwing the threads together. The tightening force is achieved by screwing the actuating sleeve on the working tool, wherein the actuating sleeve is axially supported at the holder sleeve by stop means facing opposite to the direction in which the working tool is inserted into the holder.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
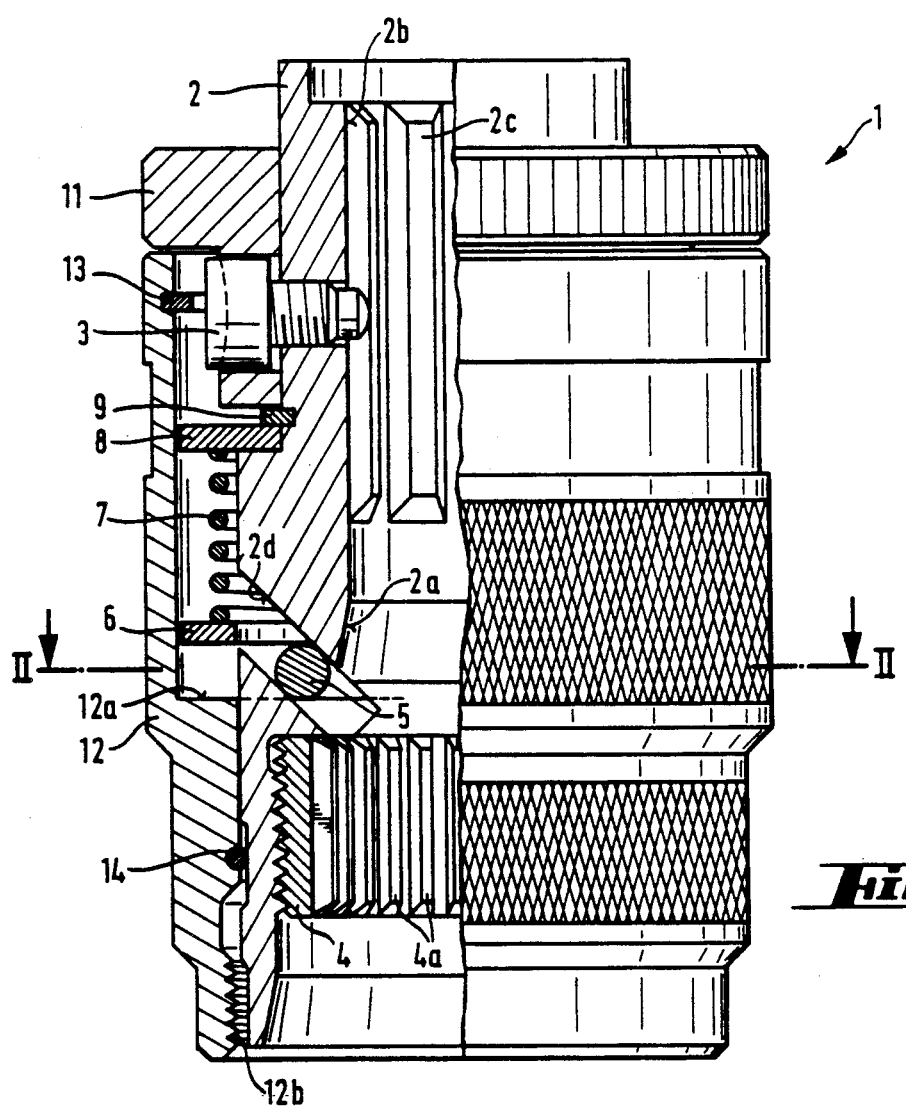
FIG. 1 is an elevational view, partly in axial section, illustrating a working tool holder without the inserted working tool.

Working tool holder 1 includes an axially extending holder sleeve 2 with an axially extending holder opening 2a. The holder sleeve 2 has a first end, the lower end in FIG. 1, and a second end, the upper end in FIG. 1. Opening 2a extends axially from the first end toward the second end and, spaced from the first end, the opening has an axially extending conically shaped section. Extending from the second end of the holder sleeve 2, is a cylindrically shaped borehole 2b extending to the holder opening 2a. The wall of the borehole 2b has splined shaft toothing 2c, to provide a connection of the holder to an outlet spindle of a drilling or chiseling device so that the holder and the device can be secured against relative rotation. Working tool holder 1 can be axially secured on the output spindle, not shown, by a set screw 3, extending through the holder sleeve 2 into the borehole 2b. Within the axial extent of the tool holder opening 2a there is a ring 4 with axially extending inwardly projecting ridges 4a, formed in the manner of toothing so that the inwardly projecting ridges 4a extend into the clear bore formed by the tool holder opening 2a. The ring 4 is secured within the holder sleeve 2 by means of a threaded engagement with the sleeve.

Figure 2:
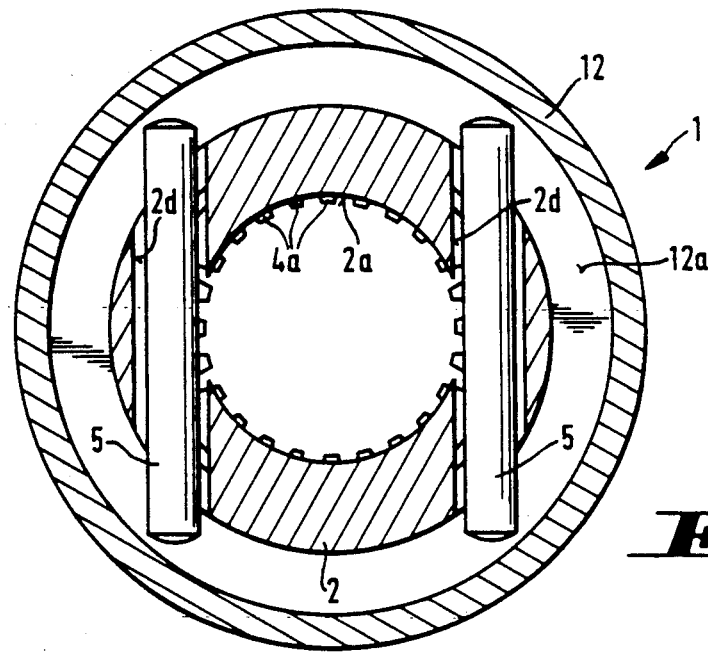
FIG. 2 is a transverse cross sectional view through the working tool holder, taken along the line II—II in FIG. 1.

As can be noted best in FIG. 2, two diametrically opposite slots 2d extending transversely of the axial direction of the holder sleeve 2 extend diagonally relative to the sleeve axis and extend inwardly into the holder opening 2a. A pin 5 is supported in each slot 2d, so that it is displaceable in a tangential or chordal direction relative to the holder opening 2a, along the slot depth or radial dimension. The opposite ends of the pins 5 project outwardly through the outside surface of the holder sleeve 2.

An adjusting disc 6 is supported around the holder sleeve 2, so that it can be displaced concentrically relative to the sleeve and is supported in the axial direction on the outwardly projecting ends of the pins 5. Adjusting disc 6 is biased against the pins by a pressure spring 7 encircling the outside surface of the sleeve with the upper end of the spring bearing against a stop ring 8 serving as an abutment. Stop ring 8 is held axially in position relative to the holder sleeve 2 by a securing ring 9 seated within the outside surface of the sleeve. A hold-up ring 11 is supported on the securing ring 9, and extends around the end portion of the holder sleeve 2, adjacent to its second end. An actuating sleeve 12 is mounted on and extends around the holder sleeve 2 so that the actuating sleeve is axially and rotatably displaceable relative to the holder sleeve. A supporting ring, secured in the actuating sleeve 12, is located in the axial projection of the stop ring 8 and serves to define a axial displacement path of the actuating sleeve. Intermediate its ends, in its inside surface, actuating sleeve 12 has a shoulder 12a facing toward the second end with the shoulder bearing against the pins 5 on the side of the pins closer to the first end of the holder sleeve 2. The shoulder 12a can lift the pins out of the clear bore or width of the holder opening 2a, as shown in FIG. 1. The disengagement of the pin is effected by the axial displacement of the adjusting disc 6 against the biasing force of the pressure spring 7. Spaced between the shoulder 12a and the first end of the holder sleeve 2 is a securing element 14, in the form of an elastic sleeve, which is tightened when the holder sleeve 2 is supported in the actuating sleeve 12. At its end region, adjacent the first end of the holder sleeve 2, actuating sleeve 12 has an internal thread.

Figure 3:
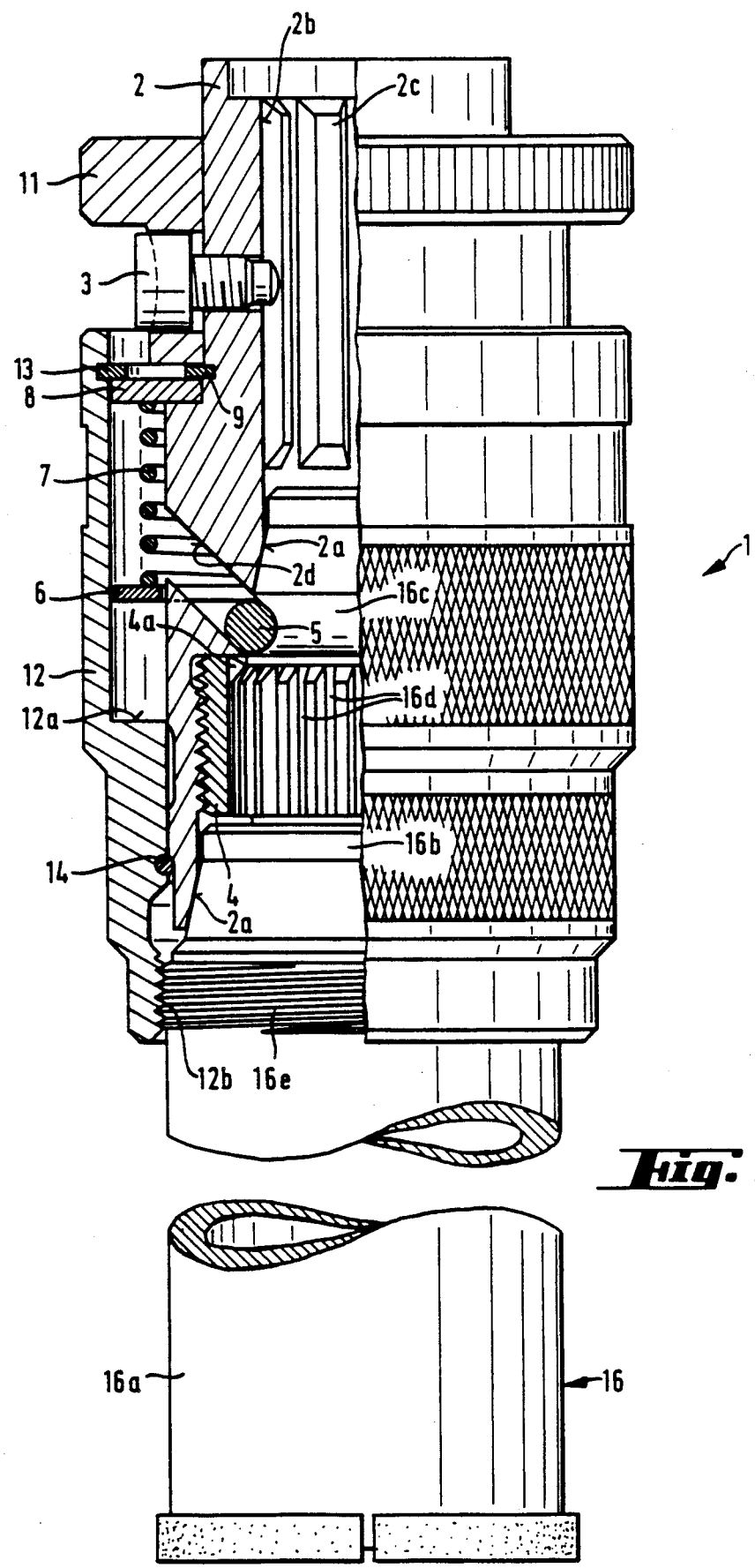
FIG. 3 is a view of the working tool holder, similar to FIG. 1, however, with the working tool inserted into the holder.

Working tool 16, as shown in FIG. 3, has a substantially axially extending cylindrically shaped base body 16a including a cutting end, at its lower end as viewed in FIG. 3, and an insertion shaft 16b, at its upper end. Insertion shaft 16b has an axially extending conically shaped section and has recesses 16c formed by a circumferentially extending annular groove around the outside of the shaft. Adjacent the recesses 16c, and extending toward the cutting end, the insertion shaft 16b has a multi-toothed profile forming axially extending grooves 16d. Adjacent the conically shaped section of the insertion shaft 16b, is a circumferentially extending external thread 16e located closer to the cutting end. The insertion shaft 16b of the working tool 16 is inserted axially into the tool holder opening 2a of the holder sleeve 2. As a result, the conically shaped outer section of the insertion shaft 16b contacts the conically shaped region of the holder opening 2a and the ridges 4a seat within the grooves 16d. Working tool 16, inserted into the working tool holder 1, is locked by means of the pins 5 entering into the recesses 16c. To achieve this engaging action, the actuating sleeve is displaced toward the first end of the holder sleeve 2, that is, opposite to the inserting direction for working tool 16, so that the spring-loaded adjusting disc 6 moves the pins radially inwardly into the recesses 16c. During the axial movement of the actuating sleeve 12, its internal thread 12b engages the corresponding external thread 16e on the insertion shaft. The insertion shaft is clamped with its conically shaped section in contact with the conically shaped section in the holder opening 2a by screwing the actuating sleeve 12 onto the working tool 16. To apply the clamping force, the supporting ring 13 bears against the stop ring 8, note FIG. 3. Securing element 14 prevents the actuating sleeve 12 from rotating relative to the working tool and thus prevents any disengagement of the working tool 16 from the tool holder 1.

While specific embodiments of the invention have been shown and described in detail to illustrate the application of the inventive principles, it will be understood that the invention may be embodied otherwise without departing from such principles.

We claim:

1. A working tool holder for a drilling or chiseling device and for securing a working tool, said working tool holder comprises an axially extending holder sleeve having a first end and a second end spaced apart in the axial direction with an axially extending tool opening for a shaft of a working tool extending from the first end thereof toward the second end, at least an axially extending section of said tool opening being conically tapered inwardly toward the holder sleeve axis in the direction toward the second ends, pins mounted in said holder sleeve are movable generally radially inwardly and outwardly relative to said opening, said pins extending chordally relative to said opening, radially inwardly directed axially extending projections extending into said opening for engagement within corresponding axially extending grooves in an insertion shaft of a working tool, said working tool having recesses for receiving said pins, and an actuating sleeve located around and axially displaceable relative to said holder sleeve between a first position without a working tool in the holder opening and a second position with a working tool secured in the holder opening, with said actuating sleeve being movable in the direction from the second end toward the first end of said holder sleeve, means in said actuating sleeve for spring biasing said pins into engagement with said recesses of said working tool and for moving said pins out of engagement with said recesses of said working tool against the spring biasing, wherein the improvement comprises that said actuating sleeve is rotatable about the axis of said holder and has a first end adjacent the first end of said holder sleeve and a second end adjacent the second end of said holder sleeve, connecting means on said actuating sleeve and said working tool for securing said working tool within said holder sleeve, said connecting means comprises an internal thread in said actuating sleeve located adjacent the first end thereof and an external thread on said insertion shaft, and said internal thread being screwably engageable with said external thread.

2. The working tool holder, as set forth in claim 1, wherein a securing element is located in contact with and extends between an inside surface of said actuating sleeve and an outside surface of said tool holder sleeve, adjacent the first end thereof, for preventing disengagement of said connecting means.

* * * * *